United States Patent [19]

Hansman, Jr. et al.

[11] Patent Number: 5,313,202
[45] Date of Patent: May 17, 1994

[54] METHOD OF AND APPARATUS FOR DETECTION OF ICE ACCRETION

[75] Inventors: Robert J. Hansman, Jr., Cambridge, Mass.; Adam L. Dershowitz, New York, N.Y.

[73] Assignee: Massachusetts Institute of Technology, Mass.

[21] Appl. No.: 8,822

[22] Filed: Jan. 25, 1993

Related U.S. Application Data

[63] Continuation of Ser. No. 635,888, Jan. 4, 1991, abandoned.

[51] Int. Cl.$^5$ ............................................. G08B 21/00
[52] U.S. Cl. ................................. 340/962; 244/134 R; 340/580; 340/581
[58] Field of Search ............... 340/962, 946, 580, 581, 340/582, 583; 73/178 H, 462, 66, 602; 244/17.11, 134 R, 134 D, 134 E; 374/109, 121, 123, 131; 250/342, 339

[56] References Cited

U.S. PATENT DOCUMENTS

| | | |
|---|---|---|
| 2,359,787 | 10/1944 | Peters et al. . |
| 2,419,454 | 4/1947 | Le Clair . |
| 2,766,619 | 10/1956 | Tribus et al. ........................ 340/581 |
| 2,789,281 | 4/1957 | Short et al. . |
| 3,046,537 | 7/1962 | Dow . |
| 3,123,327 | 3/1964 | Padgett, Jr. ......................... 340/580 |
| 3,229,271 | 1/1966 | Frant .................................. 340/581 |
| 3,341,835 | 9/1967 | Werner et al. . |
| 3,541,540 | 11/1970 | Hughes . |
| 3,836,846 | 9/1974 | Overall et al. . |
| 4,054,255 | 10/1977 | Magenheim ...................... 73/178 H |
| 4,057,049 | 11/1977 | Hill . |
| 4,274,091 | 6/1981 | Decker ................................ 340/583 |
| 4,636,091 | 1/1987 | Pompei et al. ..................... 250/342 |
| 4,782,331 | 11/1988 | Martens .............................. 340/580 |
| 4,808,824 | 2/1989 | Sinnar ............................... 244/134 E |

OTHER PUBLICATIONS

"Aircraft Icing Handbook-vol. I", U.S. Dept. of Transportation Publication No. DOT/FAA/CT-88/8-1 (Mar. 1988).
A. L. Dershowitz et al, "Passive Infrared Ice Detection for Helicopter Applications", 46th Anual Forum of the American Helicopter Society, May 1990.
R. Henry et al, "Application of Infrared Thermography to the Interpretation of Tests in an Icing Wind Tunnel", French Society of Heat Engineers, Jan. 18, 1989.
S. A. Skebe, "Synchronous Thermography", United Technologies Research Center, Feb. 23, 1990.
R. J. Hansman, Jr., "Modeling of Surface Roughness Effects on Glaze Ice Accretion", 27th Aerospace Sciences Meeting, Jan. 1989, AIAA-89-0734.

*Primary Examiner*—Brent Swarthout
*Attorney, Agent, or Firm*—Burns, Doane, Swecker & Mathis

[57] ABSTRACT

Method and apparatus for detecting icing, particularly on airfoils such as helicopter rotor blades, by detecting warming caused by latent heat released as water freezes. The sensors may be multiple or single, contact or remote.

19 Claims, 13 Drawing Sheets

*FIG. 11A*
WAVE 02 FILTER 10KHZ

*FIG. 11B*
WAVE 59 FILTER 10KHZ 5,313,202

METHOD OF AND APPARATUS FOR DETECTION OF ICE ACCRETION

The Government has rights in this invention pursuant to Grant Number NAG3-927 awarded by the National Aeronautics and Space Administration.

This application is a continuation of application Ser. No. 07/635,888, filed Jan. 4, 1991, now abandoned.

BACKGROUND

The present invention relates to the detection of ice accretion on the surface of an object which, during use, is subjected to atmospheric conditions in which an ice layer may form.

The reliable detection of ice accretion is important in several applications. One application of particular significance is in the all-weather operation of aircraft. During such operation, ice accretion on critical flight components must be detected with sufficient sensitivity that an operator can receive a "Caution and Warning" alert before a dangerously thick ice layer can form.

The above considerations come into play even more forcefully for moving-wing aircraft such as helicopters. Helicopter exposure to icing conditions has increased over the past decade because of the increase in routine instrument flight operations. Helicopter rotor icing can present a significant hazard due to increased torque requirements, aerodynamic performance degradation, control problems, and severe vibrations resulting from uneven ice shedding.

Because rotating components often experience icing conditions that are significantly different from those experienced by the fuselage, visual evidence of ice accretion on non-rotating structures is not adequate for Caution and Warning applications. Moreover, indirect indications of icing, such as torque rise or vibration increase, typically emerge only after a hazardous condition exists. On the other hand, the direct measurement of ice accretion on the rotating components would provide the earliest detection and most accurate measurement of a potential icing hazard.

Ice detection is also important in the management of ice protection systems. A common type of ice protection system is the electrothermal de-icer, which requires so much electrical power that airfoils are typically de-iced in segments. Without effective ice detection, it is necessary to overheat and continually cycle the electrothermal de-icing system to assure adequate ice protection. If an effective ice detector were available, electrothermal de-icers could be operated more efficiently and effectively.

The ice detectors most commonly employed for aviation applications are the direct-contact-type devices. In the typical direct-contact detector, a probe or surface-mounted transducer senses the presence of ice through a variety of physical mechanisms, such as by measuring resonant frequency shifting, optical blocking, heat capacity, electrical capacity or ultrasonic thickness. Direct-contact detectors are described in A. Heinrich et al., "Aircraft Icing Handbook—Vol. I", U.S. Dept. of Transportation Publication No. DOT/FAA/CT - 88/8-1 (March 1988).

Contact-type ice detectors have not been successfully used for direct measurement of rotor ice accretion due to the severe difficulties encountered in instrumenting a rotor. These difficulties include mounting restrictions imposed by structural limitations of the rotor blade, transmission of information between the rotating and non-rotating frames, acceleration limitations of the sensors, and erosion problems. As a result, a contact-type ice detector is typically mounted on the fuselage and the rotor's icing condition is inferred from the fuselage's condition. Such indirect ice detection has had only limited success because of the complex dependence of the icing process on the temperature, liquid water content, and velocity, all of which vary significantly between the fuselage and the rotor, as well as along and across each rotor blade.

Direct ice detection via remote sensing offers significant advantages for monitoring rotating blades. If ice accretion can be remotely detected by sensors mounted in the fuselage, then a direct measurement of rotor ice accretion can be accomplished without the difficulties identified above. Several techniques, including high-speed video and active microwave systems, have been investigated for remote ice detection.

SUMMARY

The present invention exploits the temperature gradient which develops on a surface partially covered with an ice layer to detect the presence of the ice layer. Specifically, the system uses the temperature differential between two displaced points on a surface to detect ice accretion on the surface when it is subjected to atmospheric conditions in which an ice layer may form. In one specific embodiment, a passive IR system is used to detect ice accretion on airfoils through remote IR thermometry of the icing surface. In addition, the passive IR system described below can also be used to monitor the operation of ice protection systems. The system employing remote IR thermometry find special utility for detecting ice on helicopter rotors.

BRIEF DESCRIPTION OF THE DRAWINGS

The features and advantages of the present invention will be understood by reading the following detailed description in conjunction with the drawings in which.

DETAILED DESCRIPTION

Figure 1:
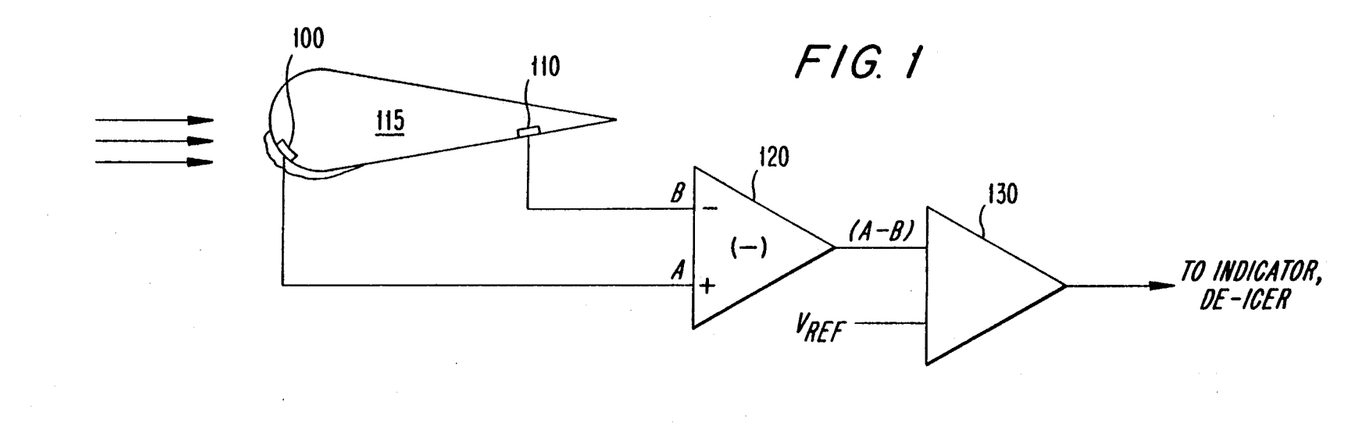
FIG. 1 is a partially cross-sectional, partially diagrammatic view of an airfoil ice detecting system according to one embodiment of the present intention.

The present invention exploits the principle, described below, that a measurement of the difference between the surface temperature (1) at a point on the surface in an ice accretion region where the ice layer can be expected to form and (2) a point on the surface at which it can be expected ice accretion will not occur can suffice to detect the presence of ice. For a stationary airfoil, to take a concrete example, the first of these points would be in the ice accretion region at the airfoil's leading edge region (at or near the leading edge stagnation point) and the other at the trailing edge region. This arrangement is depicted in FIG. 1. A first contact sensor 100 is positioned to measure the surface temperature in the ice accretion region in the leading edge region of an airfoil 115 while a second contact sensor 110 is positioned to measure the surface temperature in the trailing edge region. The outputs of the sensors 100, 110 are supplied to a differential amplifier 120 which produces a signal indicative of their difference. A comparator 130 produces an output when the magnitude of the difference signal exceeds a predetermined threshold which determines the existence of an ice layer. This output can then be used to activate a warning system, a de-icing system, or some other system if desired.

A measurement of the temperature difference could be based on knowledge of the ambient temperature coupled with the assumption, true in most instances, that the ambient temperature can be related with the trailing edge temperature. Icing can also be detected solely on the basis that the surface temperature at the leading edge is near freezing while the ambient temperature is lower. Either of these methods, however, would require measurement of absolute rather than relative temperatures, which might necessitate more complex instrumentation. For reasons set forth below, however, it is possible to assume that the leading edge temperature is close to zero in wet (glaze) conditions, providing a ready reference for calibration.

Figure 2A:
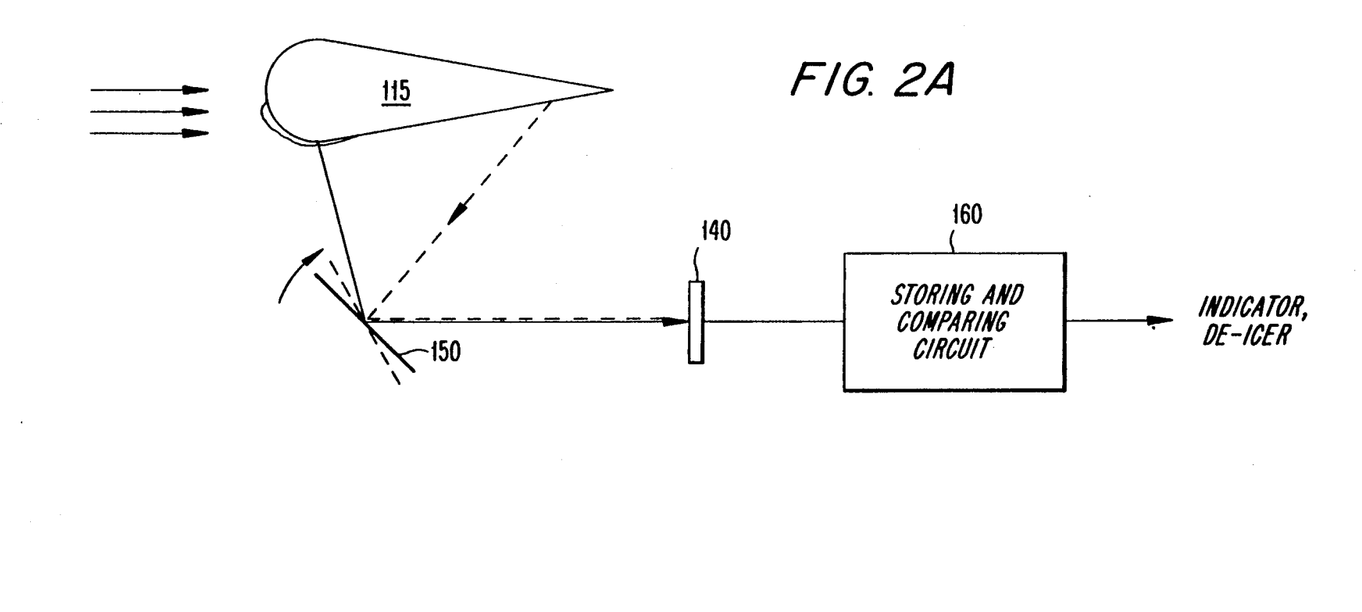
FIG. 2A is a partially cross-sectional, partially diagrammatic view of an airfoil ice detecting system according to a second embodiment of the present invention.

As shown in FIG. 2A, it is also possible to use a single remote detector 140 arranged to scan the airfoil using a rotating mirror 150 or other device so that its field of view would first include a point on the leading edge and then a point on the trailing edge. For such an arrangement, the temperature signals associated with the points of interest would be separated in time. The signal for one of the points, which point being known from the position of the mirror, would be retained by a storing and comparison circuit 160 until the signal for the second point is obtained, at which time they could be compared.

Figure 2B:
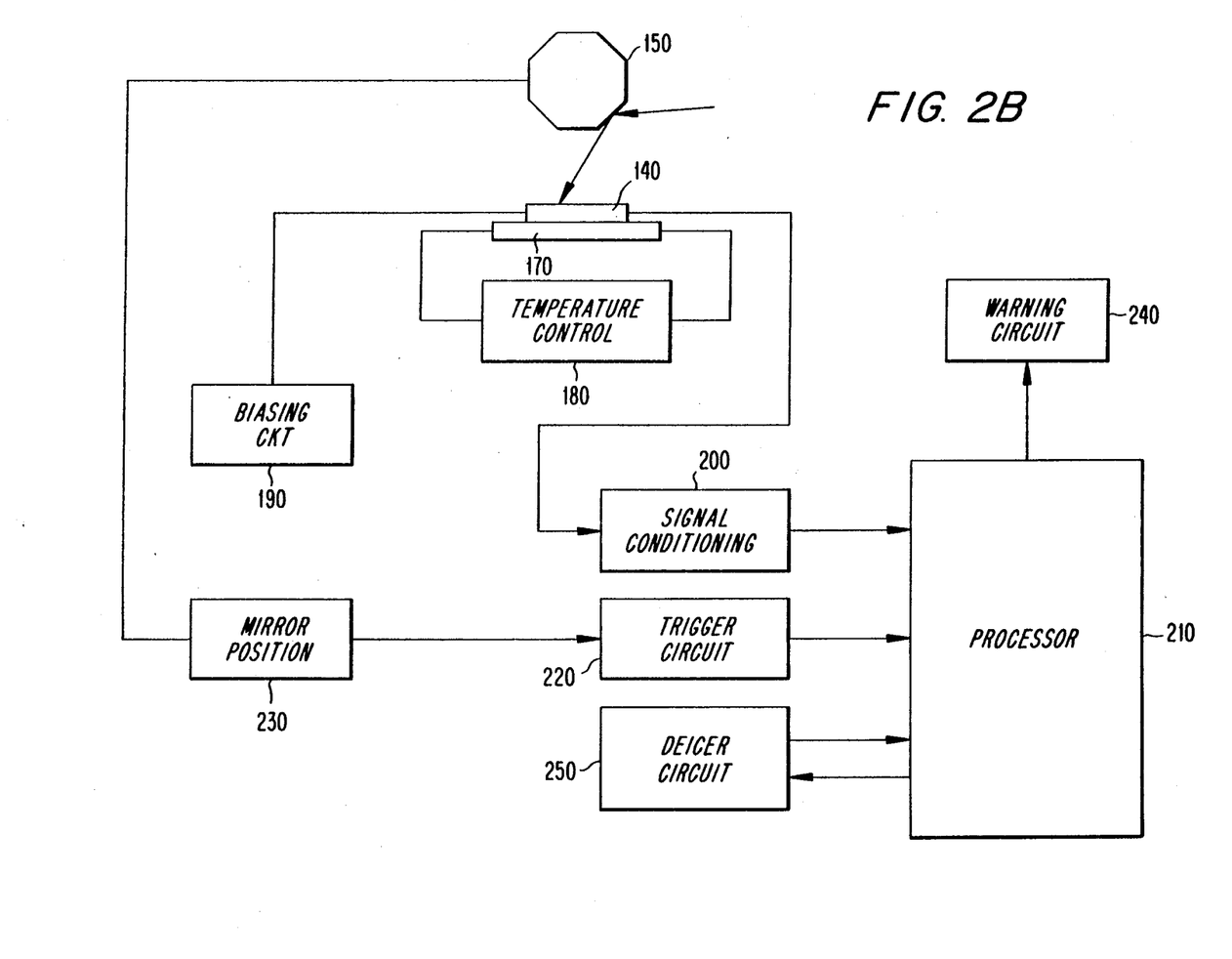
FIG. 2B is a block diagram showing certain components of the ice detection system of FIG. 2A in greater detail.

FIG. 2B shows the detector arrangement of FIG. 2A in more detail. The remote detector 140 is in a heatconducting relationship with a thermoelectric cooler 170. This thermoelectric cooler 170 is in a feedback loop with a temperature control circuit 180 which maintains the thermoelectric cooler 170 and, hence, the remote detector 140 at a constant temperature appropriate for the type of detector chosen to serve as remote detector 140. This all, of course, assumes thermoelectric cooling. Other types of cooling such as cryogenic cooling are also possible. The remote detector is also biased at an appropriate level by a biasing circuit 190.

The remote detector 140 produces a signal representative of the amount of infrared radiation radiating from the portion of the surface currently in its field of view. This signal is conditioned and by a signal conditioning circuit 200 supplied as one input to a processor 210.

Processor 210 also receives as an input a trigger signal received from a trigger circuit 220. This trigger circuit 220 provides a signal, based on the angular position of rotating mirror 150 as supplied by a mirror position circuit 230, by which the processor 210 can associate a temperature signal with the position of the surface being scanned.

Processor 210, which may be a suitably programmed microprocessor, then determines the magnitude of the difference in temperature between a predetermined region in the accretion region and a predetermined region outside the accretion region. If the magnitude of the difference is greater than a predetermined threshold, processor 210 produces an output to a warning circuit 240. Alternatively or additionally, the processor 210 can output a signal to a de-icer circuit 250 to instruct it to begin de-icing. The de-icer circuit 250 can also provide an input to the processor 210 so that processor 210 knows that de-icing is in progress. This prevents spurious operation based on the processor 210 unwittingly attempting to read the distorted temperature profile of an airfoil undergoing de-icing.

Figure 3A:
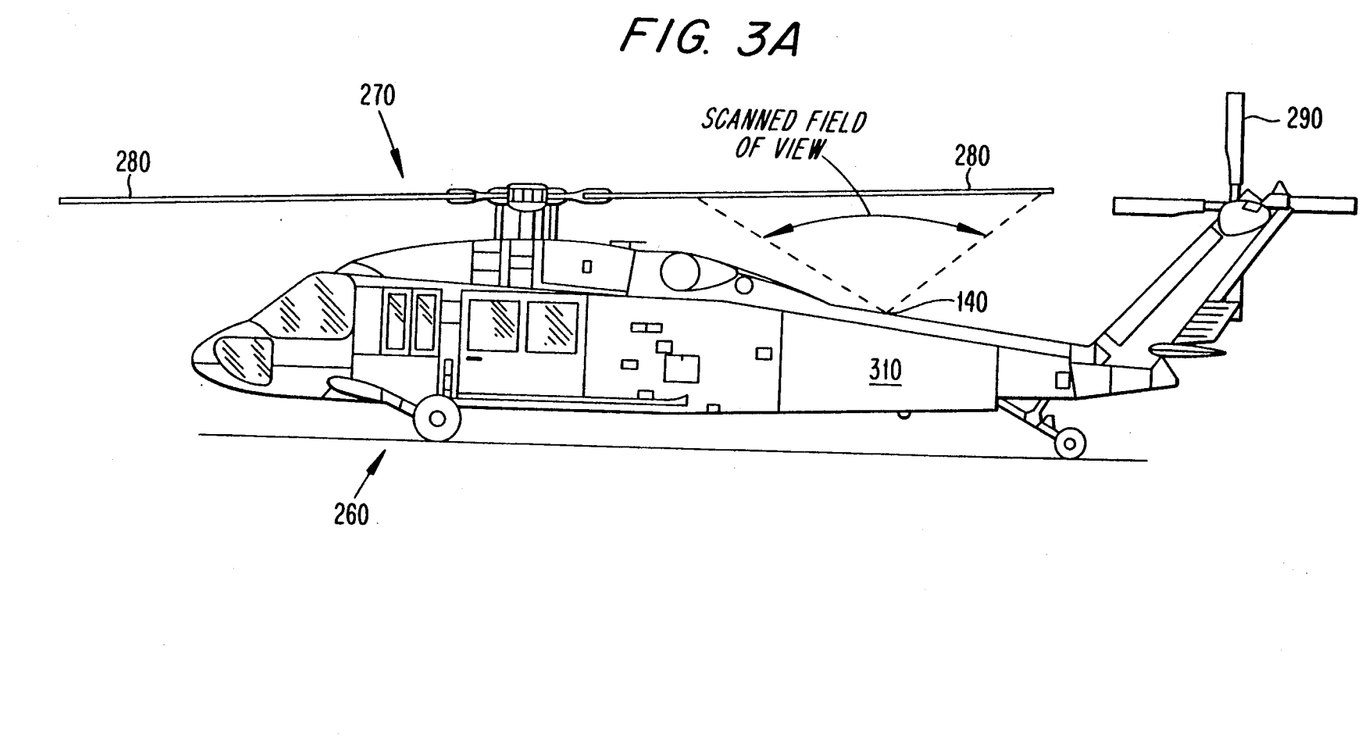
FIG. 3A illustrates a passive IR remote ice detector mounted on a helicopter.
Figure 3B:
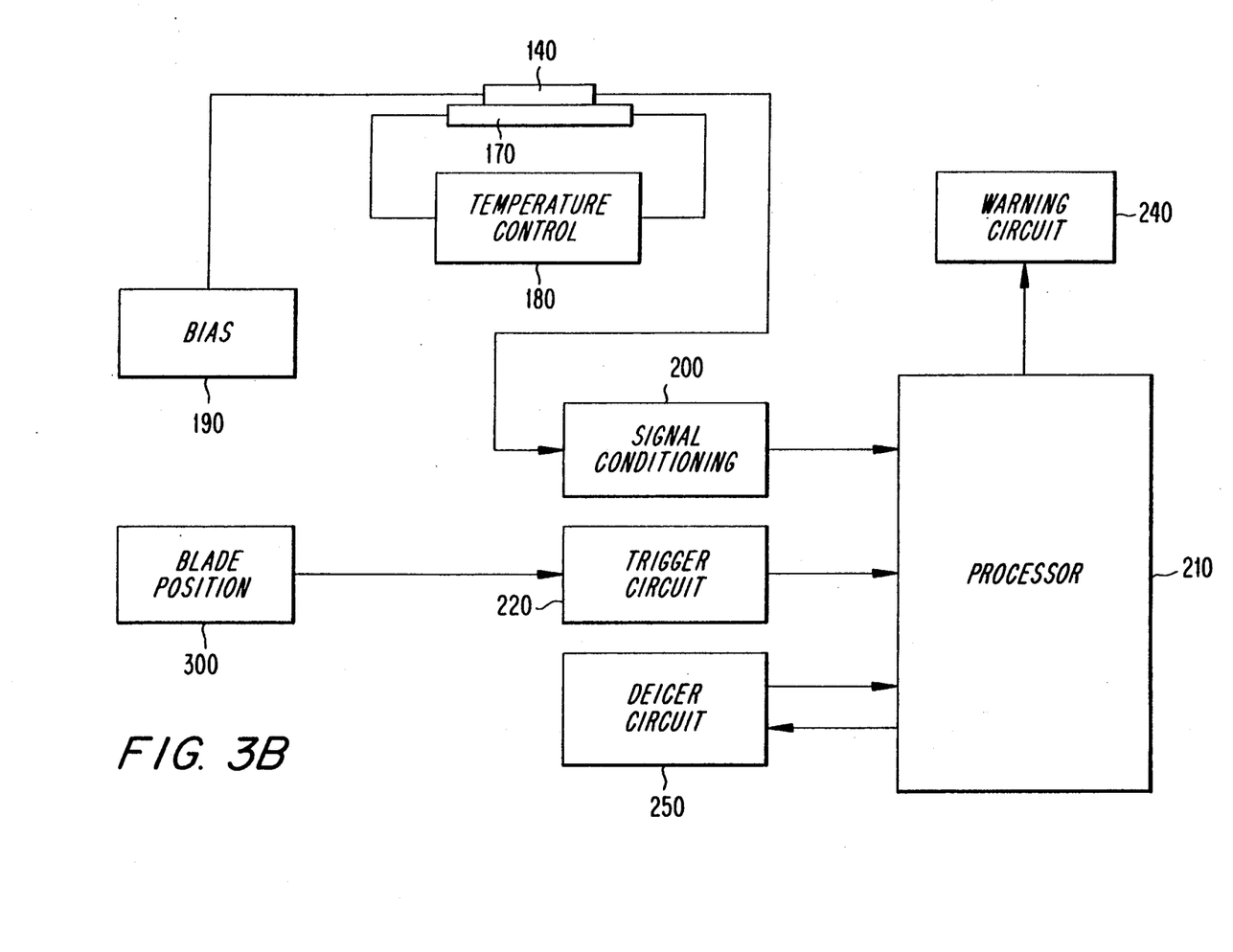
FIG. 3B is a block diagram of components of the ice detection system of FIG. 3A.

The use of a remote sensor is especially attractive for moving-wing aircraft. The physical positioning of a passive IR sensor for detecting icing on a rotor of a helicopter 260 is shown in FIG. 3A. In the arrangement shown in FIG. 3, the IR sensor is positioned to detect ice on the main rotor 270 made up of blades 280. It will be understood that the system could also be used to detect ice on the tail rotor 290. The details of construction as shown in FIG. 3B are essentially the same as those described above, that is, an effective ice detector preferably comprises a single IR detector 140, suitable optics to position and scan the detector's FOV on the airfoil, in this case the main rotor 270, and suitable electronics to monitor the detector's output and determine chordwise temperature profiles as the blades 280 move through the FOV. The primary difference is that a rotating mirror is no longer necessary because the blades 280 are in motion with respect to the stationary field of view of the detector 140. Preferably, blade position is determined using a blade position circuit comprising, for example, an opto-interrupter, to provide a trigger signal for identifying the temperatures at the leading and trailing edges. The blades' surface temperatures are thus advantageously measured at a few points along each blade chord by the ice detector, which can be easily mounted on the helicopter's fuselage 310, as the blade 280 moves through its FOV. The single detector also can scan each blade 280 in the spanwise direction using a moving mirror. The mirror would ideally be stationary for several blade passes, and then moved to reflect radiation from another spanwise location to obtain data there.

A suitable IR detector would be selected to be particularly sensitive to the blackbody radiation emitted by objects at near-freezing temperatures. The peak of the black body curve at about 0° C. is about 10 µm. In practice, however, 2-5 µm is believed to be the best spectral range because of a trade-off between available detector performance and black body signal strength. Semiconductor diode detectors, such as Indium Antimonide (InSb), Indium Arsenide (InAs), Lead Selenide (PbSe), Mercury Cadmium Telluride (HgCdTe) and Silicon (Si), as well as bolometers, thermopiles, some vidicons, and pyroelectric detectors have suitable spectral responses. Of course, it will be appreciated that detectors that can operate using thermoelectric rather than cryogenic cooling and that have sufficient sensitivity and suitable electrical characteristics, such as sufficient frequency response, as determined through conventional infrared receiver design practices, would minimize the cost and complexity of the ice detector and thus be preferred. Pyroelectrics, HgCdTe and PbSe detectors, among others, are commonly used for remote surface temperature measurements.

Figure 4:
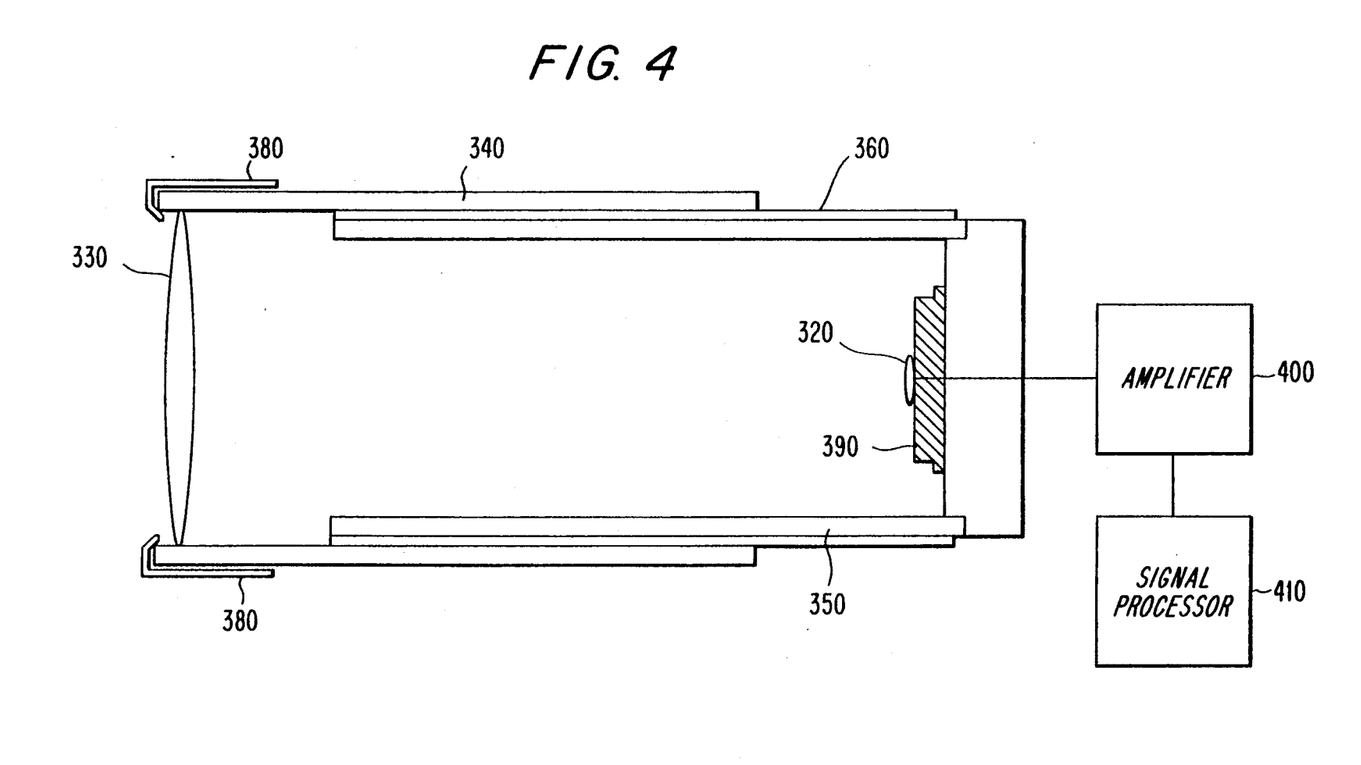
FIG. 4 is a block diagram of a passive IR remote ice detector.

FIG. 4 shows a prototype ice detector that has been developed for flight and ground tests. It will be appreciated by those of ordinary skill in the art that the details of the ice detector are determined to a great extent by the environment in which it is used. Although a prototype system is described below, the principles of geometrical optics and conventional optical receiver design practices would be used to adapt the prototype as needed to different conditions.

As illustrated in FIG. 4, the prototype ice detector was built around a HgCdTe (Mercury Cadmium Telluride) IR detector 320. This detector 320 was chosen for its high sensitivity in the 2-5 µm spectral range using conventional thermoelectric cooling down to 200° K., thus avoiding the need for cryogenic cooling. Suitable detectors and thermoelectric coolers are commercially available from several sources, including InfraRed Associates, Inc., New Brunswick, N.J., Judson Infrared, Inc., Montgomeryville, Pa., and Santa Barbara Research Center, Goleta, Calif.

The HgCdTe detector 320 was in the form of a square measuring 0.25 mm by 0.25 mm. It was disposed on the optical axis of a simple Calcium Fluoride (CaF$_2$) lens 330, which was chosen for its high transmissivity over the detector's spectral range and its relatively high resistance to thermal shock and water damage. The lens 330 selected had a diameter of 5 cm and a focal length of 7.5 cm, but it will be appreciated that other IR-transmitting lens materials, such as Barium Fluoride, and other lens parameters could be used. To allow the focus to be adjusted from 15 cm to infinity, the lens 330 and detector 320 were mounted in concentric tubes 340, 350 one of which had a polytetraflouroethylene plastic sleeve 360 to facilitate adjustment. The optics are preferably arranged so that the detector FOV is smaller than the expected size of the initial accretion region on the airfoil's leading edge.

For the tests described in more detail below, small jets 380 were provided to direct a flow of dry nitrogen gas across the lens 330 to prevent lens icing and fogging. Other means of preventing lens fogging and icing, such as an electrically heated wiregrid, might also be effective, particularly for mass-produced detectors. Care should be taken, however, to ensure that the grid size is large enough so as not to filter out IR radiation from the surface being observed. For such a lens de-fogger/de-icer, cyclic operation may be best, with the detector taking measurements only during the off cycle.

The detector 320 is in thermal contact with a thermoelectric cooler 390 to control its temperature during operation.

The electrical output of the HgCdTe detector 320 is filtered and amplified by a conventional amplifier 400 and presented to an electronic signal processor 410. In general, the IR detector and electronics need sufficient electrical bandwidth to permit reliable comparisons of the leading and trailing edge temperatures.

Figure 5A:
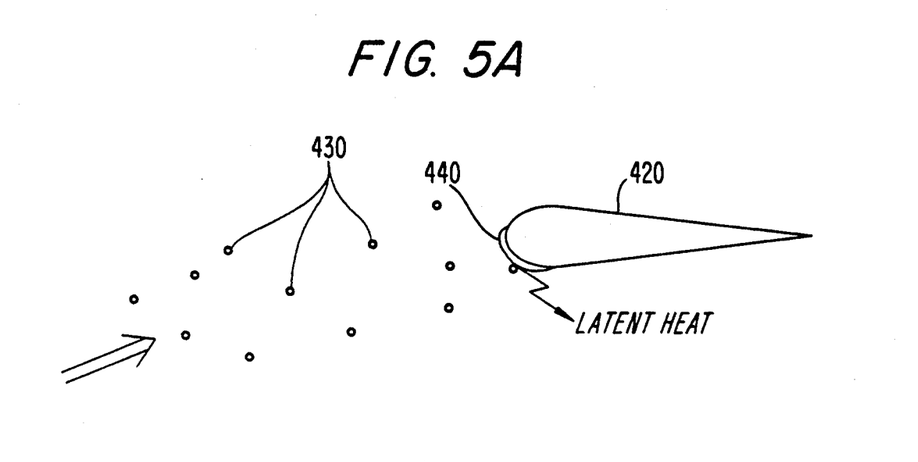
FIG. 5A is a schematic representation of latent heat release during icing.
Figure 5B:
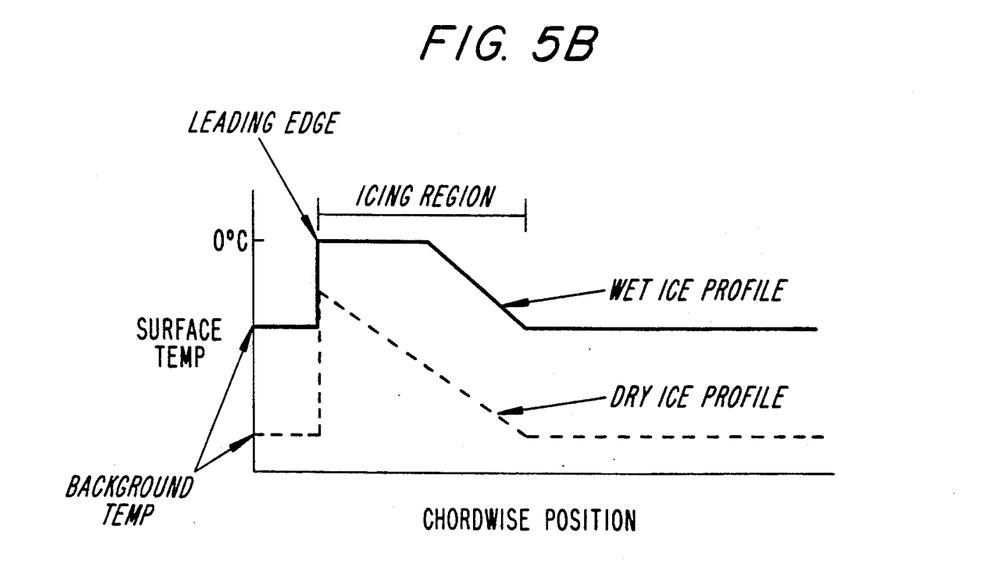
FIG. 5B is a schematic chordwise temperature profile of a rotor blade in wet (glaze) and dry (rime) icing conditions, respectively.

The theory underlying an ice detector according to the present invention is as follows. When ice forms on a surface, such as a fixed wing or rotor airfoil, the region where the accretion occurs becomes warmer than the surrounding surface due to release of the latent heat of fusion as the impinging supercooled water droplets freeze. This process is shown schematically in the case of an airfoil in FIG. 5A, and a schematic chordwise temperature profile is shown in FIG. 5B. As an airstream moves past an airfoil 420, supercooled droplets 430 impinge on the airfoil 420 and condense, forming an accretion region 440 and releasing heat (indicated by the jagged arrow). This heat is released predominantly into the surrounding air, and to a lesser extent into the body of the airfoil. As illustrated in FIG. 5A, the accretion region 440 is localized in a small region near the leading edge of airfoil 420, and much of the surface of airfoil 420 remains clear of ice. Accordingly, the non-iced airfoil surface has a temperature at or near the ambient temperature (which in icing conditions is always below the freezing point), and the iced leading edge is warmer, as illustrated in FIG. 5B.

As a result of these thermodynamic processes, characteristic chordwise surface temperature profiles are generated under different icing conditions. Prior to icing, the airfoil's surface equilibrates to a background temperature slightly warmer than the static air temperature due to kinetic heating. During icing, ice forms in a leading edge accretion region formed around the stagnation point. The surface temperature increases in the accretion region due to the release of latent heat of fusion from the water to ice phase transition. For wet (glaze) ice accretions, the wet stagnation region will remain at 0° C. while for dry (rime) accretions the temperature will peak in the stagnation region at some temperature below freezing. Here as elsewhere, the term "surface" is used to refer to the outermost surface of the structure and so may be ice (in dry icing conditions), liquid water (in wet icing conditions), or the exterior of the airfoil surface itself where no ice has formed.

Schematic temperature profiles are shown in FIG. 5B for wet (glaze) and dry (rime) icing conditions, in solid and broken lines, respectively. Wet (glaze) ice accretions are those in which the liquid water content ("LWC") and ambient temperature are such that the ice layer is wet. As can be seen in the broken line figure, the airfoil's surface temperature in the accretion region for wet (glaze) ice accretions increases to and remains at the freezing point. The broken line shows the temperature profile for dry (rime) ice accretions, that is, accretions in which the LWC and ambient temperature are such that the ice layer is dry. As can be seen, the surface temperature in the accretion region rises only to a temperature less than the freezing point. The profile shown in broken line is characteristic of dry (rime) ice growth where the surface temperature reflects the local droplet collection efficiency (viz., increased impingement causes increased icing and increased heating). The stagnation point has the largest collection efficiency and consequently the greatest latent heat release.

It will be appreciated that the passive IR system has the capacity to monitor the operation of thermal de-icing systems. Once ice sheds, the relatively hot blade surface will be exposed, presenting an identifiable thermal signature to the detector.

Although it is sometimes difficult to accurately measure absolute airfoil surface temperature due to uncertainty in surface emissivity, attenuation through the icing cloud, and thermal drift of the detectors, it has been found that relative temperature resolution of about 0.2° C. is achievable. This is considered adequate for ice detection where only the relative temperature profile between the leading and trailing edge regions is required.

Figure 6A:
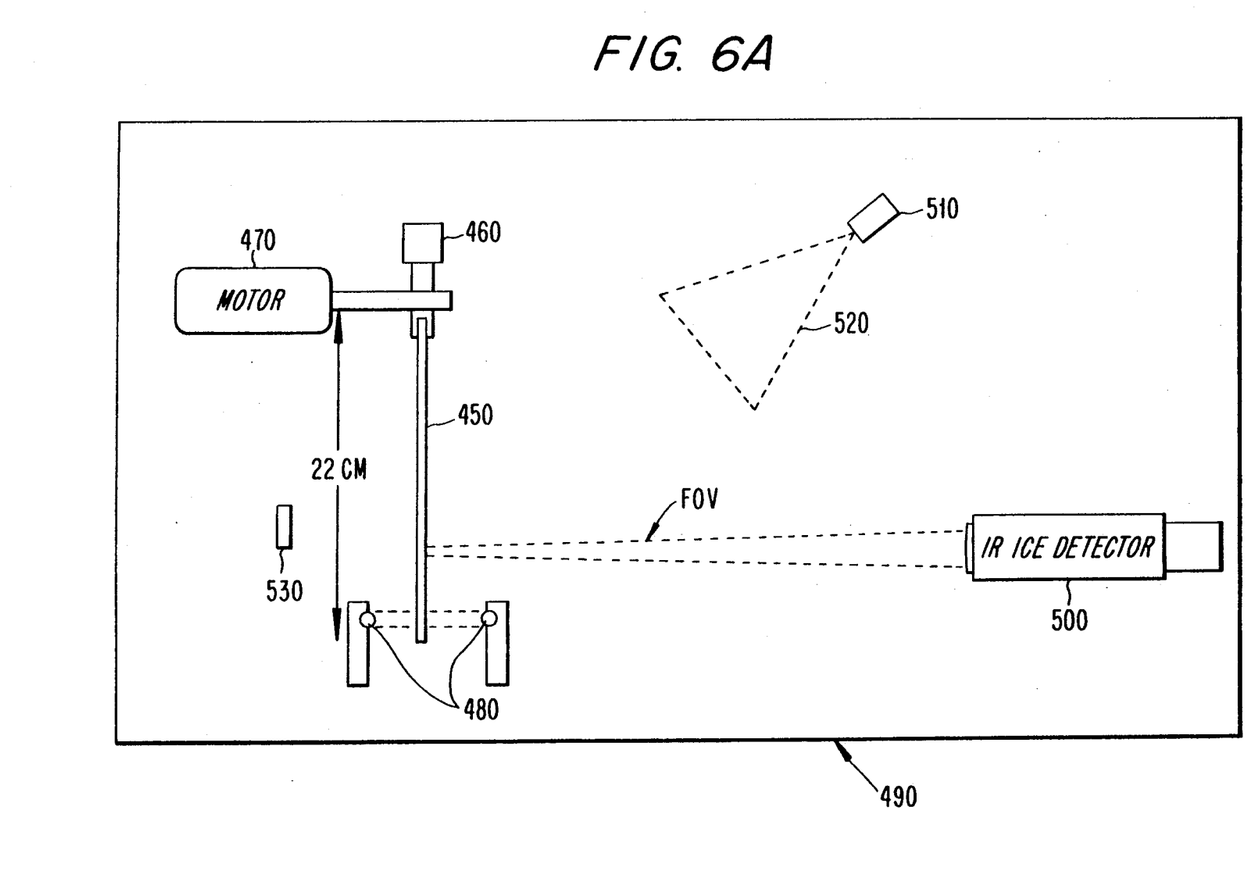
FIGS. 6A and 6B are diagrams of a test apparatus for the passive IR remote ice detector.
Figure 6B:
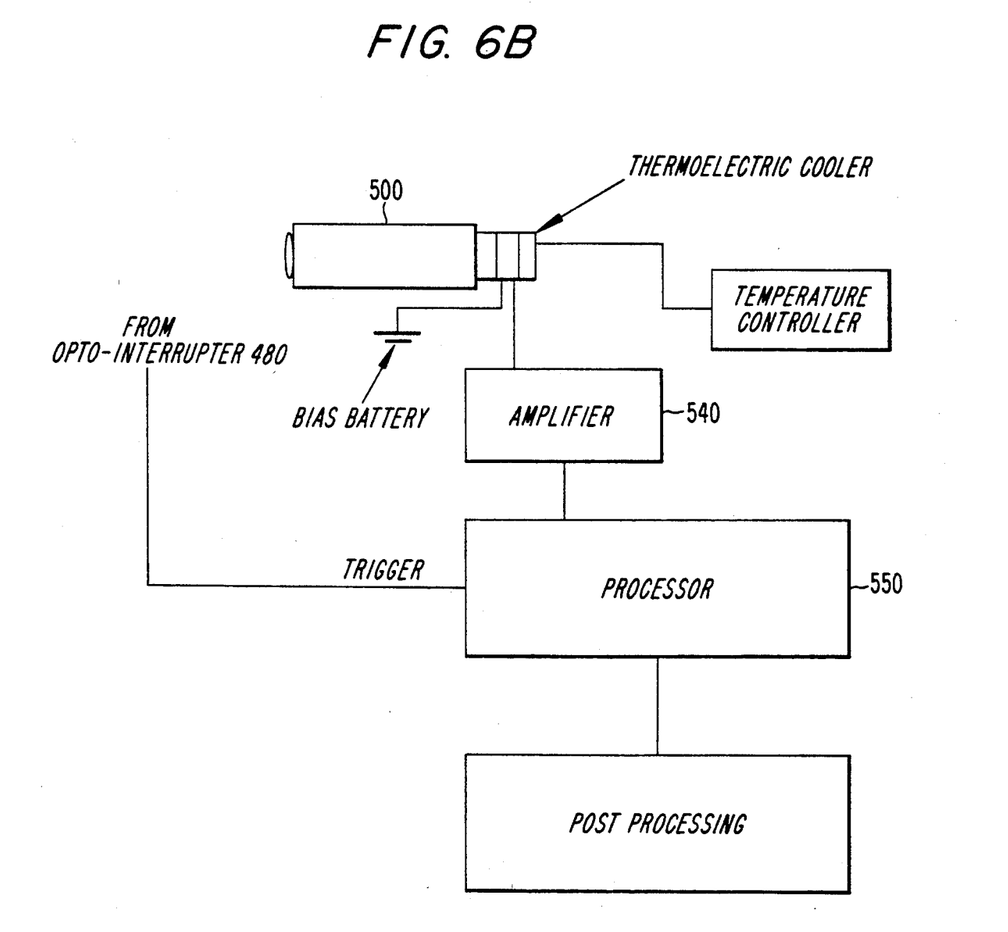

In order to test the performance of the prototype ice detector, a test apparatus was constructed as illustrated in FIGS. 6A and 6B. The test apparatus included a single, aluminum rotor blade 450 having a 22-cm radius, a 2-cm chord and an angle of attack fully adjustable between ±90°, a suitable counterbalance 460 and a motor 470 capable of turning the blade 450 through a rotational speed range of 0–40 Hz. The blade 450 was arranged to pass through the gap of a conventional opto-interrupter 480 that was used to develop trigger pulses for tracking the blade's position and measuring its rotational speed. It will be appreciated that in an operational system, the trigger function of the opto-coupler could be replaced with suitable threshold crossing detection circuitry monitoring the detector output signal.

The small rotor allowed tests to be run in a laboratory freezer 490, in which the rotor 450 and a detector 500 were set up about 56 cm apart. The detector actually used came as a unit with a four stage thermoelectric cooler with an automatic controller to keep the temperature of the detector at −73° C. A gel battery was used to provide the bias for the detector at 2.6 V.

For the tests, the detector 500 was pointed at the rotor 450 and focussed to obtain the sharpest signal possible. A nozzle 510 provided a non-calibrated water spray 520 having an estimated liquid water content (LWC) of 0.9 g/m$^3$. The freezer's temperature was measured with a thermocouple 530 mounted just behind the rotor and screened from the water spray. Experiments were carried out over a range of freezer temperatures from −20° C. to 60° C., and at several different angles of attack.

For a typical experimental run, the blade speed and freezer temperature were allowed to stabilize and were recorded. (During a run, these values would change due to increased drag from ice formed, and also due to opening of the freezer which was necessary to initiate the spray.) A chordwise surface temperature profile of the blade 450 was then recorded. Water at 0° C. was then sprayed for 10 seconds, and another chordwise surface temperature profile was recorded. After shutoff of the water spray, several temperature profiles were recorded as the blade's temperature returned to equilibrium, at which point the blade speed and freezer temperature were again recorded. Finally, the blade 450 was de-iced, and the test cycle repeated.

The signal from the detector 500, which was a HgCdTe detector, was high-pass filtered and amplified, to remove any d.c. bias and retain only short-term temperature change information, by amplifier 540 and recorded by electronic processor 550 comprising a commercially available digital oscilloscope that was triggered by the opto-interrupter 480. Also, it was found advantageous to pass the signal through a digital low-pass filter having a cutoff frequency of 10 Khz to remove high-frequency-noise components.

A set of experimental runs was carried out for a range of freezer temperatures and a constant 0° angle of attack, which produces the smallest icing region and thus the most difficulty for an ice detector. For these runs, the blade was initially rotating at 22 Hz.

Figure 7A:
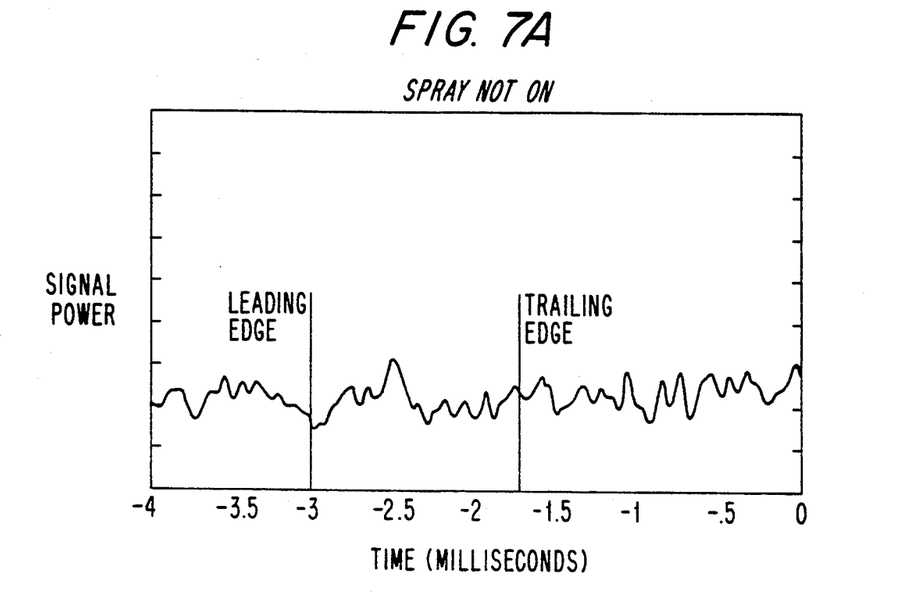
FIGS. 7A and 7B show ice detector output signals before and during icing, respectively, for an ambient temperature of $-15°$ C.
Figure 7B:
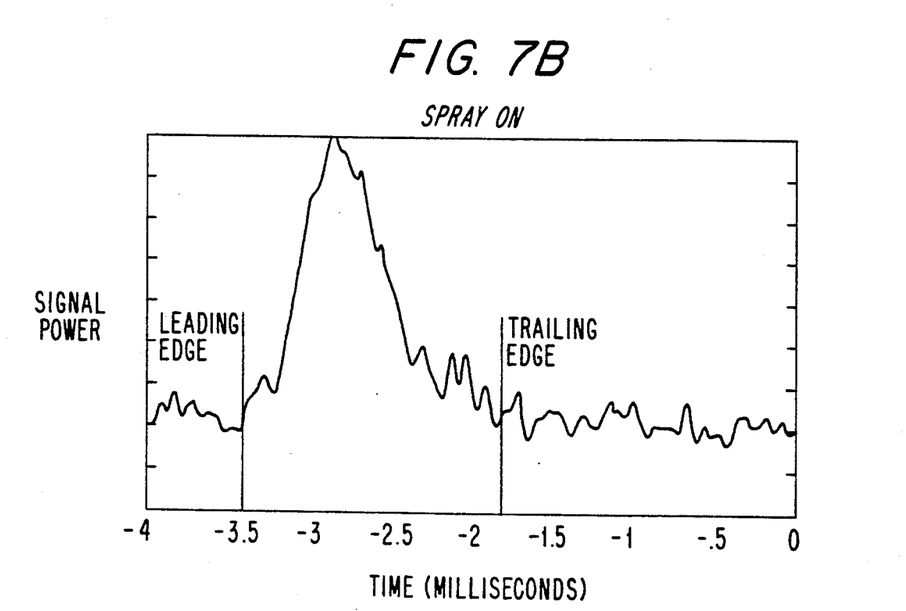

At very low temperatures there existed a very large temperature difference between the blade's ice accretion region (the leading edge) and the ambient air and the blade's trailing edge. FIGS. 7A and 7B show the ice detector's processed output signal due to the blade at a freezer temperature of −15° C. before and during icing, respectively. Before and after the blade passed, the detector was viewing the freezer wall. Before the spray began, the blade and the wall were at thermal equilibrium as indicated by the relatively flat line shown in FIG. 7A. During icing, significant heating of the ice accretion region, with almost no change in the surface temperature of the rest of the blade, is indicated by the increased signal shown in FIG. 7B.

Figure 8A:
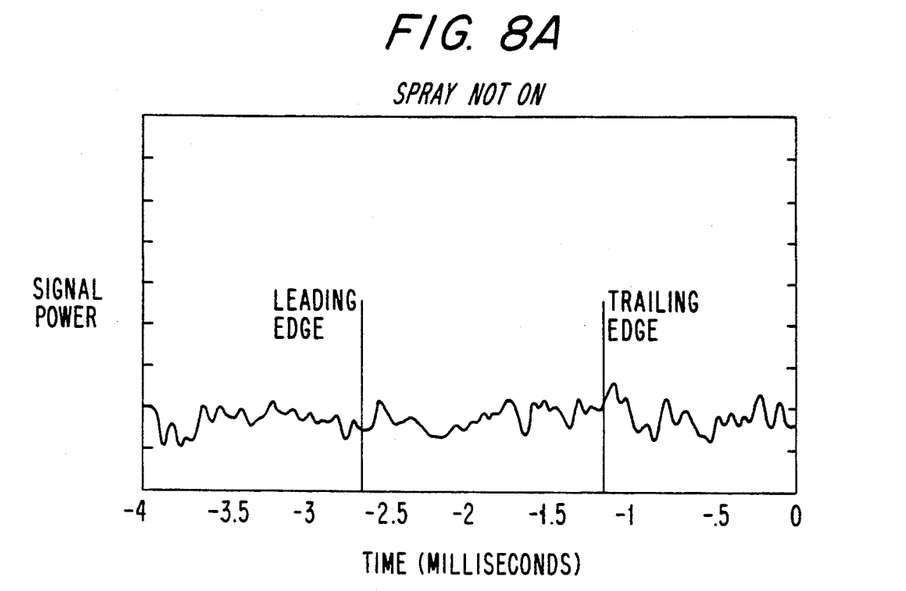
FIGS. 8A and 8B show ice detector output signals before and during icing, respectively, for an ambient temperature of −6.8° C.
Figure 8B:
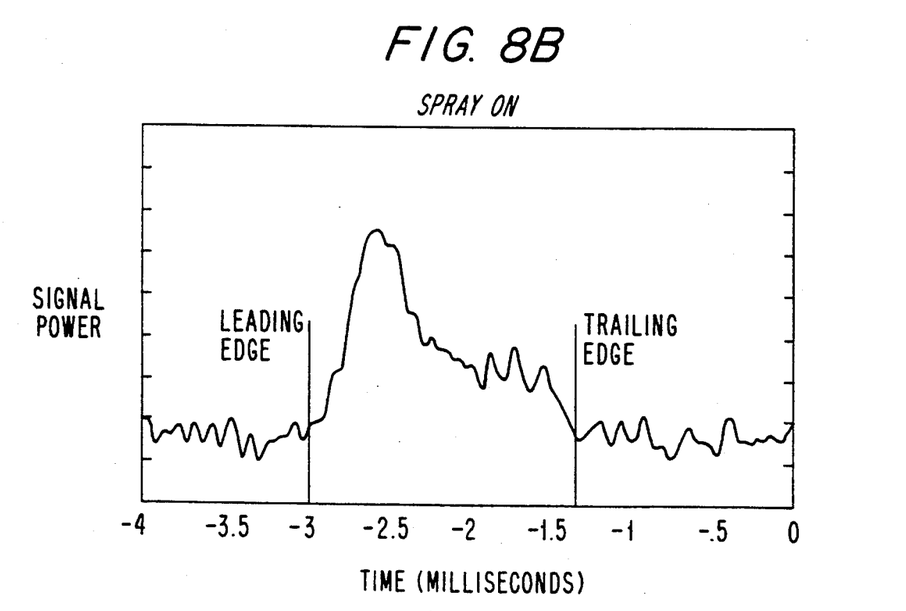

FIGS. 8A and 8B show the before and during icing signals, respectively, for a freezer temperature of −6.8° C. As seen in FIG. 8B, there was some heating of the entire blade, but the characteristic icing profile was still detected.

Figure 9A:
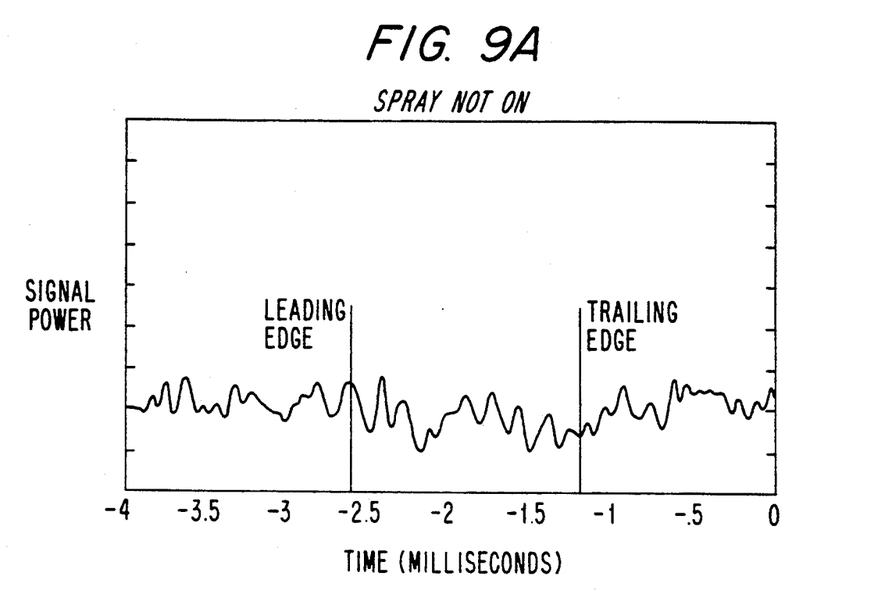
FIGS. 9A and 9B show ice detector output signals before and during icing, respectively, for an ambient temperature of −3° C.
Figure 9B:
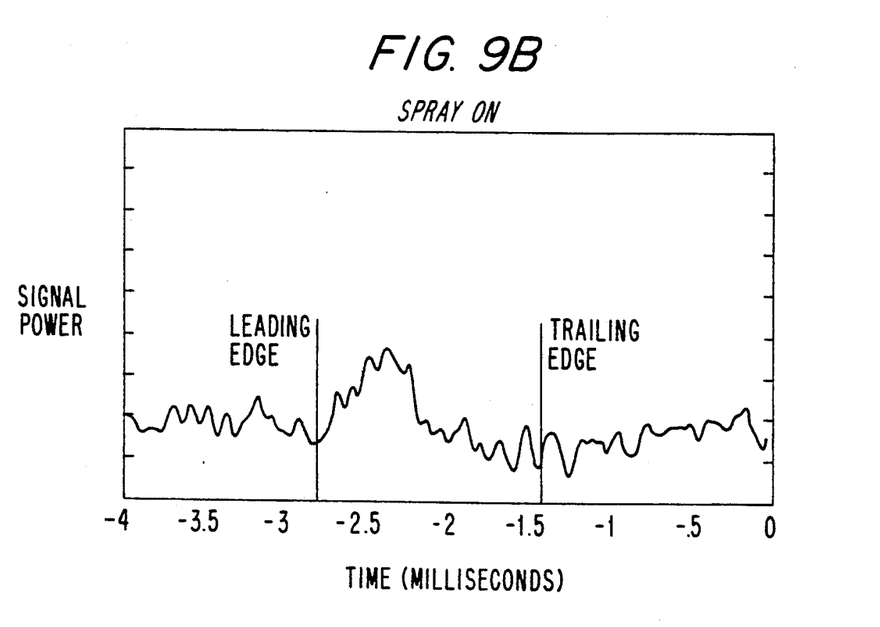

The signals obtained for a freezer temperature of −3° C. are shown in FIG. 9A (before icing) and FIG. 9B (during icing). Although the signal increase shown in FIG. 9B is small (indicating little ice accretion and thus less latent heat release), it still shows the characteristic profile indicative of icing. When the blade was stopped for de-icing, a small amount of ice was present.

Figure 10A:
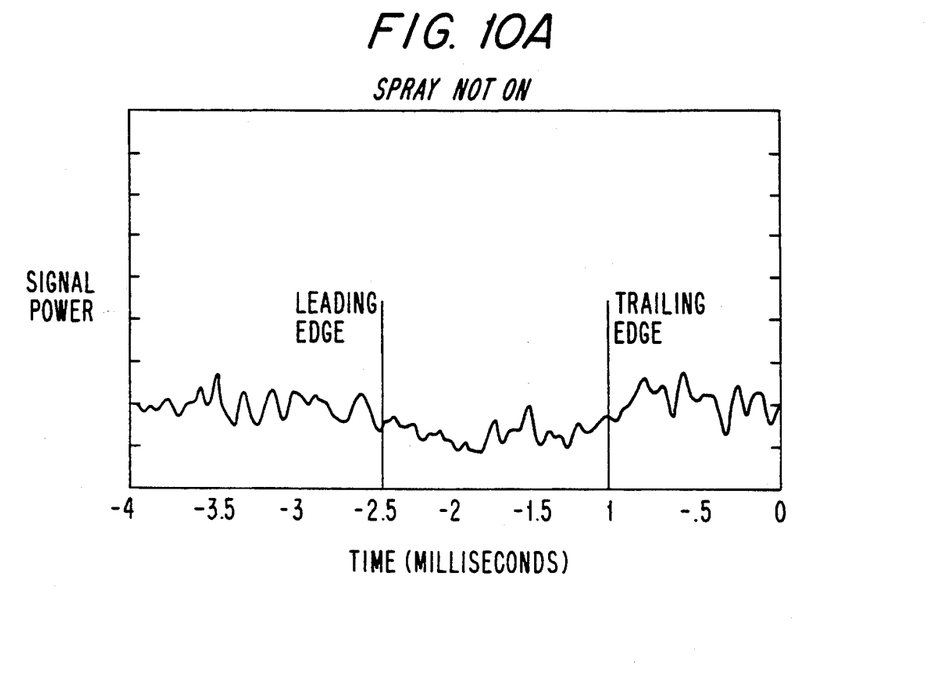
FIGS. 10A and 10B show ice detector output signals before and during icing, respectively, for an ambient temperature of −0.4° C.
Figure 10B:
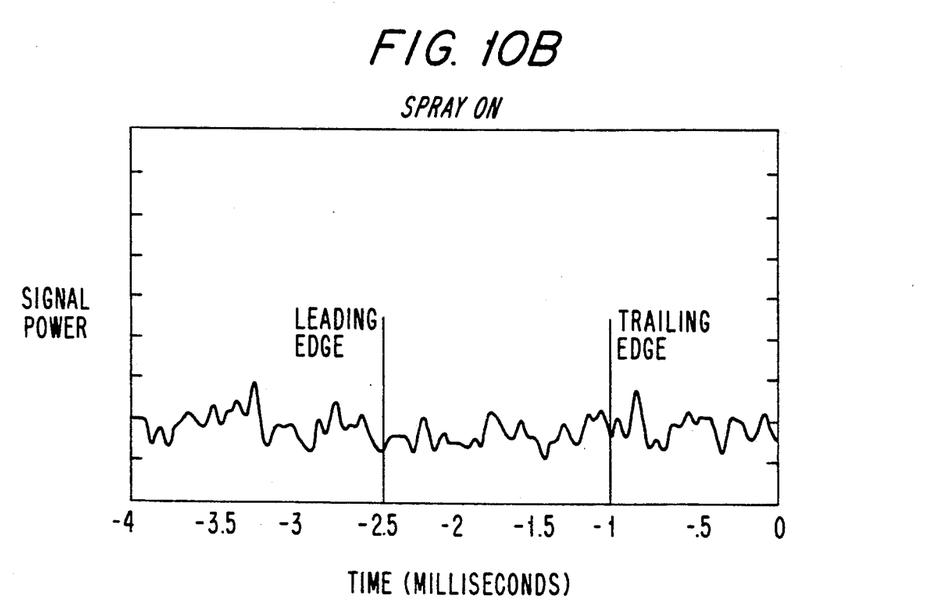

Chordwise temperature profiles obtained for freezer temperatures just above icing conditions, viz., at −0.4° C., are shown in FIG. 10A (before spray) and FIG. 10B (after spray). In FIG. 10B, a very slight warming of the entire blade can be seen, but there is no indication of any localized region where any icing was occurring. Since there was no region of significant heating, the characteristic chordwise icing temperature profile was absent.

Figure 11A:
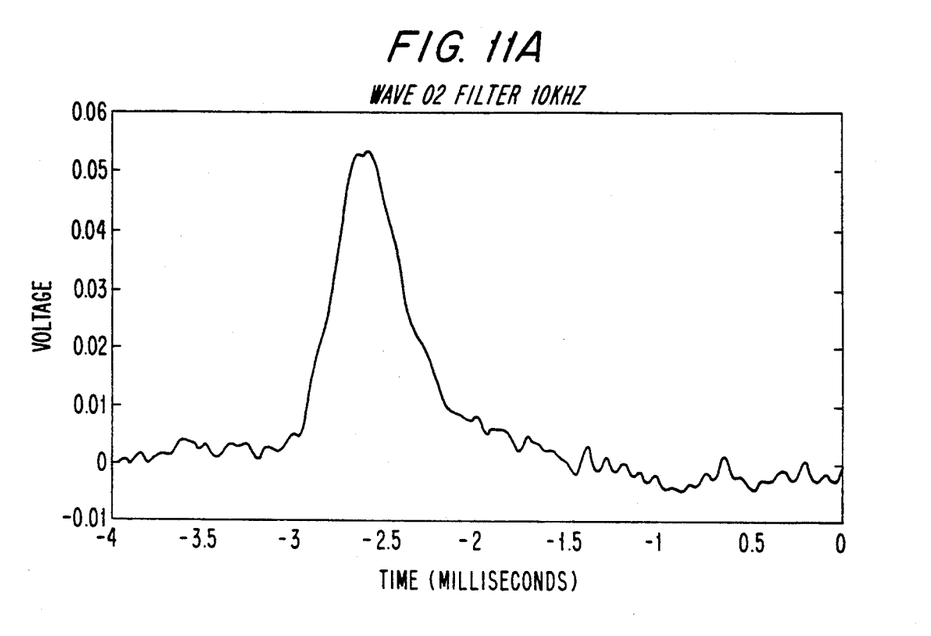
FIGS. 11A and 11B show ice detector output signals for angles of attack of 0° and 5°, respectively.
Figure 11B:
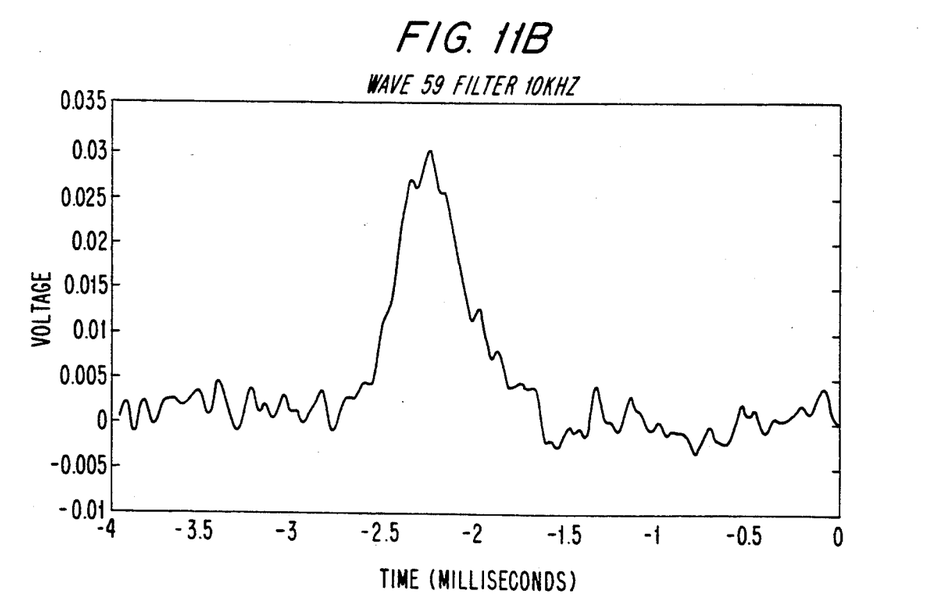

Several experimental runs were carried out at various angles of attack. FIGS. 11A and 11B show icing surface temperature profiles for angles of attack of 0° and 5°, respectively. For the signals shown, the ice detector was oriented to view the blade's pressure surface, just as it would be in a likely helicopter mounting application. (The amplifier gain in FIG. 11A was half the gain in FIG. 11B to compensate for a larger signal amplitude due to a lower freezer temperature.) The temperature profiles shown in FIGS. 11A and 11B have essentially the same shape, although the base of the 5° profile is slightly wider due to its relatively larger icing region. It was determined that changing the angle of attack did not significantly affect the observed surface temperature profiles.

While the above-described experiments demonstrate the value of the remote passive IR ice detector, it will be appreciated that the test apparatus did not permit blade flapping or significant blade bending. These effects, which occur on actual helicopters, may be expected to make it more difficult to track each blade's location and to keep each blade in focus. Nevertheless, the test results indicated that the ice accretion region tends to be wide enough and to have a temperature sufficiently different from the rest of the blade to make precise tracking unnecessary so that focus control should not be critical.

As for mounting the ice detector on an actual helicopter, it is necessary, of course, to mount the detector so that it can view the blades, but many mounting locations are expected to be suitable. Depending on the mounting location and other factors, a means of de-fogging and/or de-icing the detector's aperture may also be advisable, although the tests indicated that small amounts of ice or fog on the lens do not significantly degrade performance.

It will be understood that the foregoing description is illustrative only and that one of ordinary skill in the art will recognize various modifications that do not depart from the spirit and scope of the present invention. For example, it will be recognized that icing on structures other than airfoils could be detected, and that other applications may recommend choices for types of sensor, positioning, optics, and signal processing other than those described specifically above. For scanning a stationary structure, a device other than a rotating mirror could be used. Cooling techniques other than thermoelectric cooling could also be used. Thus, the intention should not be regarded as being limited to these embodiments, but instead as being fully commensurate in scope with the following claims.

What is claimed is:

1. Apparatus for detecting ice on a surface, said apparatus comprising:
    passive infrared sensor means for receiving infrared radiation emitted by an ice accretion region on the surface and for generating a signal indicative of a characteristic of said infrared radiation; and
    means, responsive to said passive infrared sensor means, for detecting ice in said ice accretion region at least partially on the basis of said signal,
    wherein the surface is at least part of a surface of an airfoil of an aircraft, the ice accretion region occurring at a leading edge of the airfoil, and wherein the passive infrared sensor means comprises a passive infrared sensor mounted on a fuselage of the aircraft.

2. Apparatus for detecting ice on a rotor blade of a helicopter, comprising:
    passive infrared sensor means mounted on a fuselage of the helicopter and aimed so that a leading edge ice accretion region of the rotor blade passes through a field of view of the passive infrared sensor means, said passive infrared sensor means thus receiving infrared radiation emitted by said leading edge ice accretion region when said leading edge ice accretion region of the rotor blade passes through the field of view of the passive infrared sensor, said passive infrared sensor means generating a signal indicative of a characteristic of the received infrared radiation; and
    means, responsive to said passive infrared sensor means, for detecting ice in said leading edge ice accretion region at least partially on the basis of said signal.

3. Apparatus as claimed in claim 2, wherein the rotor blade is the main rotor blade of the helicopter.

4. Apparatus for directly detecting ice on a constituent surface of interest, the apparatus comprising:
    first means for sensing a first temperature of the surface at an ice accretion region on the surface, said first means comprising a remote infrared sensor arranged to at least intermittently receive infrared radiation from the ice accretion region;
    second means for determining a second temperature of the surface at a position where ice does not accrete;
    third means, responsive to the first means and the second means, for determining when an icing condition exists based on a magnitude of a difference between the first temperature and the second temperature; and
    means for directing infrared radiation from the ice accretion region to the infrared sensor during a first time interval and from the position where ice does not accrete to the infrared sensor during a second time interval distinct from the first time interval, such that the infrared sensor serves as both the first means and the second means.

5. An apparatus as claimed in claim 4 wherein the directing means comprises a rotating mirror arranged to move the field of view of the infrared sensor.

6. An apparatus as claimed in claim 4 wherein the directing means comprises means for moving the surface with respect to the infrared sensor.

7. An apparatus as claimed in claim 6 wherein the surface is the surface of a rotor blade on a helicopter, and wherein the means for moving the surface comprises a motor for turning the rotor blade.

8. An apparatus as claimed in claim 6 further comprising means for determining a position of the surface with respect to the field of view of the infrared sensor, and wherein the third means is responsive to the position determining means to associate a signal received from the infrared sensor with a particular position on the surface.

9. An apparatus as claimed in claim 8 wherein the third means includes means for storing and recalling a value indicative of a magnitude of the signal and for storing and recalling an indication of the portion of the surface with which the value is associated.

10. An apparatus as claimed in claim 4 wherein the infrared sensor is a HgCdTe detector.

11. An apparatus as claimed in claim 10 further comprising a thermoelectric cooler for cooling the HgCdTe detector.

12. An apparatus as claimed in claim 10 further comprising an optical system for focussing an image of the surface on the detector.

13. An apparatus as claimed in claim 12 wherein the optical system comprises a lens.

14. An apparatus as claimed in claim 13 wherein the apparatus further comprises means for maintaining the lens free of fog and ice.

15. An apparatus as claimed in claim 13 wherein the lens is made of $CaF_2$.

16. Apparatus for directly detecting ice on a surface of an airfoil of an aircraft, the apparatus comprising:
    first means for sensing a first temperature of the surface at an ice accretion region on the surface;
    second means for determining a second temperature of the surface at a position where ice does not accrete; and
    third means, responsive to the first means and the second means, for determining when an icing condition exists based on a magnitude of a difference between the first temperature and the second temperature, wherein the ice accretion region is at a leading edge region of the airfoil, and the first means comprises a remote infrared sensor mounted on a fuselage of the aircraft.

17. Apparatus as claimed in claim 16, further comprising means for directing infrared radiation from the ice accretion region to the infrared sensor during a first time interval and from the position where ice does not accrete to the infrared sensor during a second time interval distinct from the first time interval, such that the infrared sensor serves as both the first means and the second means.

18. Apparatus as claimed in claim 17, wherein the aircraft is a helicopter, the airfoil is a rotor blade of the helicopter, and wherein the first means and second means together comprise a single remote infrared sensor arranged so that the ice accretion region comes into its field of view during the first interval and the position where ice does not accrete comes into its field of view during the second interval as the rotor blade rotates.

19. A helicopter comprising:
a fuselage;
a rotor blade rotatably mounted on the fuselage;
an infrared sensor, mounted on the fuselage and arranged to have a field of view through which the rotor blade passes chordwise as the rotor blade rotates, said infrared sensor producing a signal indicative of the infrared radiation emitted by a portion of said rotor blade within said field of view; and
means, within the fuselage and responsive to the infrared sensor, for determining based on said signal from said infrared sensor, the magnitude of a difference in temperature between a leading edge of the rotor blade and a position on the rotor blade streamwise displaced from the leading edge.

* * * * *